United States Patent [19]

Tominaga

[11] Patent Number: 4,909,188

[45] Date of Patent: Mar. 20, 1990

[54] CAGE FOR KEEPING PET ANIMALS

[75] Inventor: Kazutoshi Tominaga, Osakashi, Japan

[73] Assignee: Kabushiki Kaisha Tominaga Jyushi Kogyyosho, Osakashi, Japan

[21] Appl. No.: 301,316

[22] Filed: Jan. 24, 1989

[51] Int. Cl.⁴ .................................. A01K 1/03
[52] U.S. Cl. ............................ 119/17; 119/15
[58] Field of Search ............... 119/15, 17, 19, 21; 220/6, 7

[56] References Cited

U.S. PATENT DOCUMENTS

| | | | |
|---|---|---|---|
| 3,556,058 | 1/1971 | Smiler | 119/17 |
| 3,611,994 | 10/1971 | Bailey | 119/15 |
| 3,815,549 | 6/1974 | Opmeer | 119/17 |
| 3,896,766 | 7/1975 | Martin | 119/17 |

FOREIGN PATENT DOCUMENTS 255885  5/1946  Switzerland ............... 119/17

Primary Examiner—John Weiss
Attorney, Agent, or Firm—Collard, Roe & Galgano

[57] ABSTRACT

A cage for keeping pet animals, the cage including a ceiling grating, a first side grating, a second side grating rotatively connected to the first side grating, a base plate secured to the first and second side gratings; and one of the first and the second side grating including a retainer for retaining the other side grating in a rotative manner so as to secure the rotative connection therebetween.

3 Claims, 4 Drawing Sheets

CAGE FOR KEEPING PET ANIMALS

BACKGROUND OF THE INVENTION

The present invention relates to a cage for keeping pet animals such as little birds, hamsters, snakes, mice and lizards. More particularly, the present invention relates to a collapsible cage for keeping pet animals.

There are collapsible cages known in the art, which are made up of a ceiling grating, four side gratings and a base plate united in such a manner as to be capable of folding compactly when not in use. The grating sides and ceiling grating are connected to each other by means of fasteners. However, the assembling of the components by the use of fasteners is troublesome, and the small fasteners are likely to be lost before they are reused for assembly. This requires a strict maintenance of fasteners. In addition, the fasteners attached to the cage are unsightly, and spoil the ornamental value of the cage.

SUMMARY OF THE INVENTION

The present invention is directed toward a collapsible cage for pet animals which solves the problems pointed out with respect to the known collapsible cages discussed above. Thus an object of the present invention is to provide a cage capable of assembling without the use of any fasteners, thereby saving the assembling labor and cost.

Another object of the present invention is to provide a cage having an enhanced ornamental appearance.

According to the present invention there is provided a cage for keeping pet animals, the cage comprising a ceiling grating, a first side grating, a second side grating rotatively connected to the first side grating, a base plate secured to the first and second side grating, and wherein one of the first and the second side gratings is provided with means for retaining the other side grating in a rotative manner, thereby securing the rotative connection therebtween.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENTS

Figure 1:
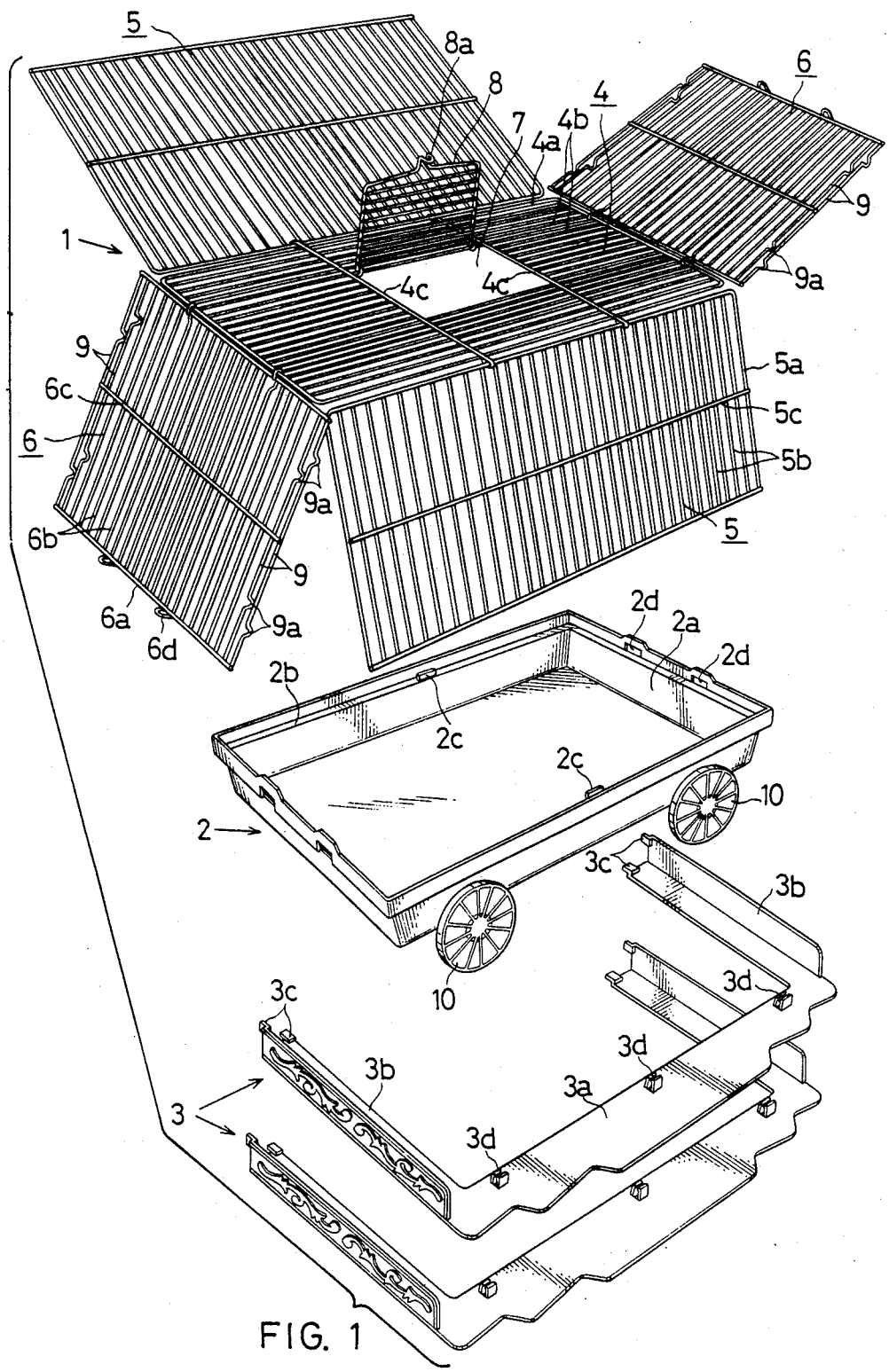
FIG. 1 is a perspective view showing a cage according to the present invention in a disassembled state.
Figure 2:
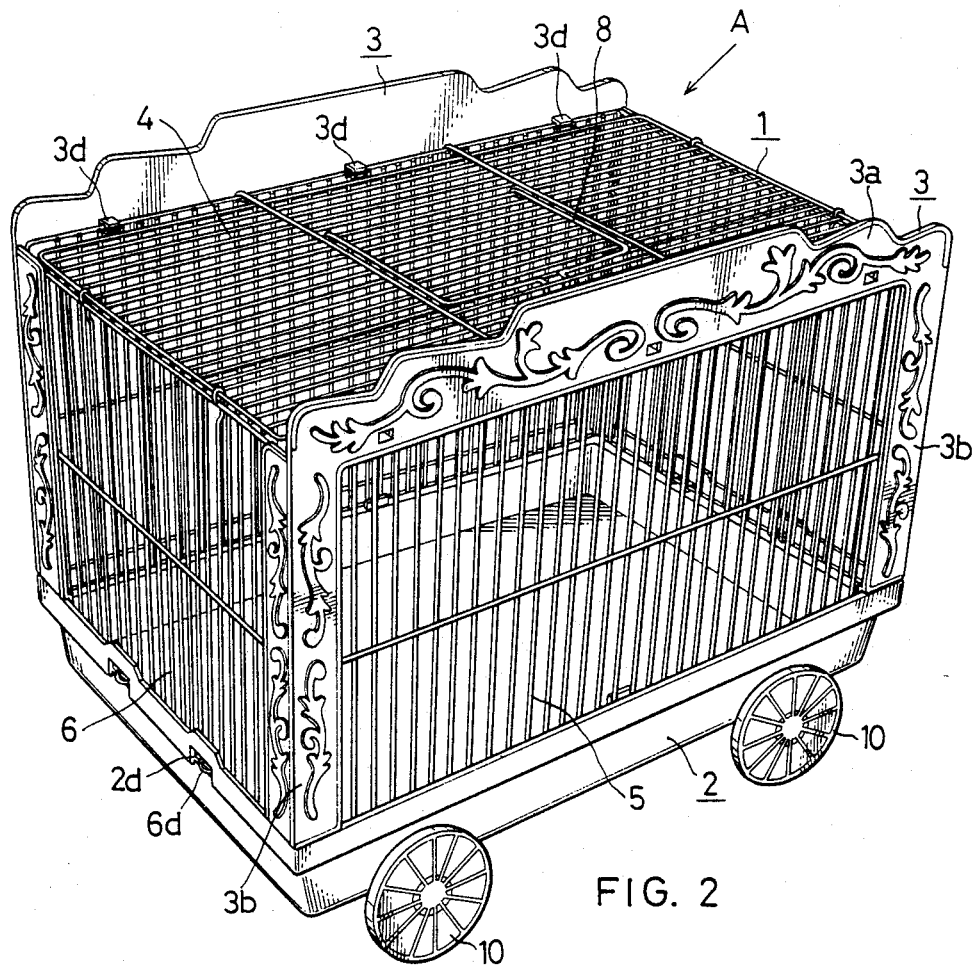
FIG. 2 is a perspective view showing the cage of FIG. 1 in a assembled state.
Figure 3:
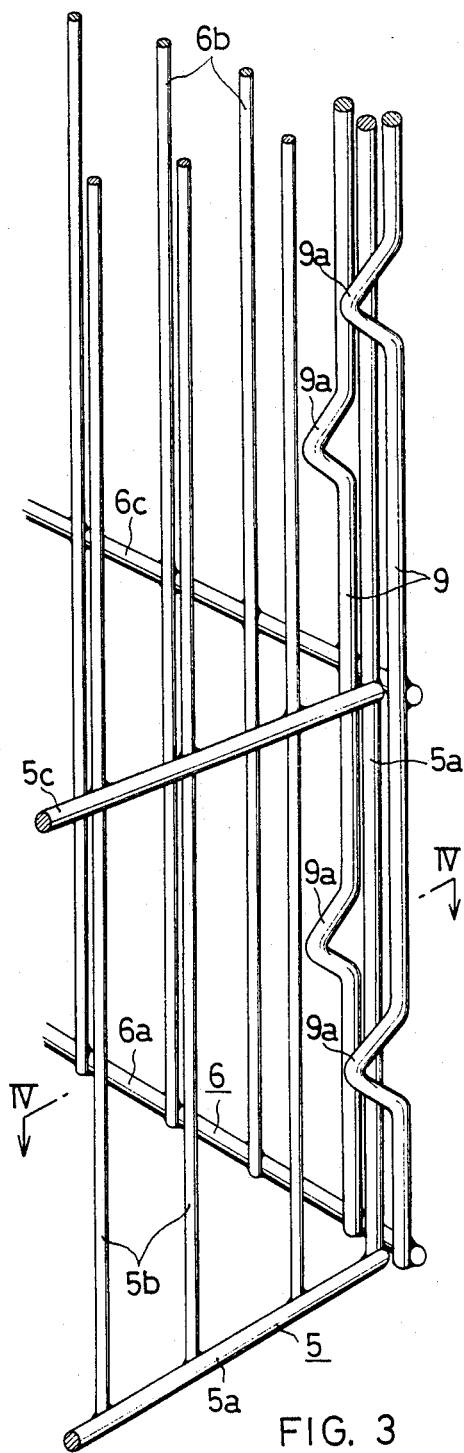
FIG. 3 is a perspective view on an enlarged scale showing two side gratings rotatively connected to each other.
Figure 4:
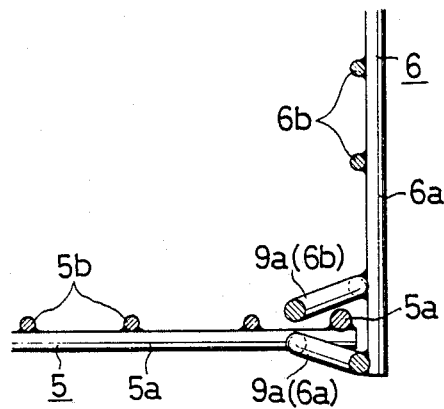
FIG. 4 is a cross-sectional view showing taken along the line IV—IV in FIG. 3.
Figure 5:
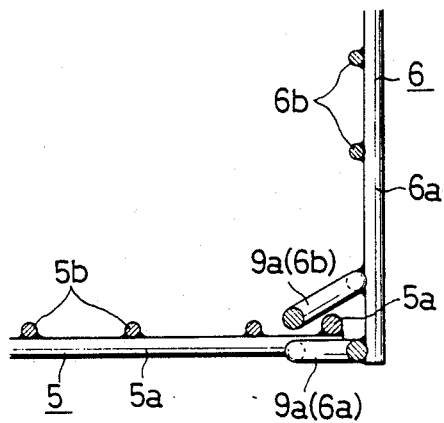
FIG. 5 is a cross-sectional view showing a modified version of the embodiment.

Referring to FIGS. 1 and 2, the cage is generally denoted by (A), which includes a cover grating 1, a base plate 2 and ornamental frames 3. The cover grating 1 includes a ceiling grating 4, a pair of first side gratings 5 and a pair of second side gratings 6, the gratings 4, 5, and 6 being rotatively connected to each other. The ceiling grating 4 includes a frame 4a, longitudinal bars 4b arranged side by side at equal spaces, and two crosswise bars 4c dividing the longitudinal bars 4b equally into three sections. The ceiling grating includes an opening 7 defined by the two crosswise bars 4c and two longitudinal bars 4b, the opening 7 being covered by a network lid 8 rotatively connected to the longitudinal bar 4b located at one of the sides of the opening 7. The network lid 8 includes a hook 8a adapted for engagement with one longitudinal bar 4b. Each first side grating 5 includes a frame 5a, crosswise bars 5b and a single longitudinal bar 5c dividing the crosswise bars 5b equally into two sections. The first side gratings 5 are rotatively connected to the crosswise bars 4c. Likewise, each second side grating 6 includes a frame 6a, crosswise bars 6b and a single longitudinal bar 6c dividing the crosswise bars 6b equally into two sections. The second side gratings 6 are rotatively connected to the frame 4a of the ceiling grating 4. As shown in FIG. 1 the rotative connection between the ceiling grating 4 and the side gratings 5, 6 is in the following manner:

Each second side grating 6 includes two locking bars 9 situated at each opposite peripheral section; one is provided by the frame 6a, and the other is by the last crosswise bars 6b. Each locking bar 9 includes a pair of retainers 9a which is shaped by bending in a triangular form toward the outside. The retainers 9a of the crosswise locking bar 9 and those of the locking frame 9 are located adjacent to each other, but preferably at different heights with respect to the base plate 2. In FIGS. 1 and 3 each retainer 9a is formed in the shape of an isosceles triangle as best shown in FIG. 4, that is, with equal legs. The retainer 9a shown in FIG. 5 is formed in the shape of a right triangle, that is, with one leg being at right angle to the side grating 5.

Each second side grating 6 includes a pair of hooks 6d in the lower side of the frame 6a, the hooks 6d being adapted for engagement with holes 2d of the base plate 2.

The ceiling grating 4 and the side gratings 5, 6 are normally made of metal bars but can be made of plastic each in one piece.

Figure 6:
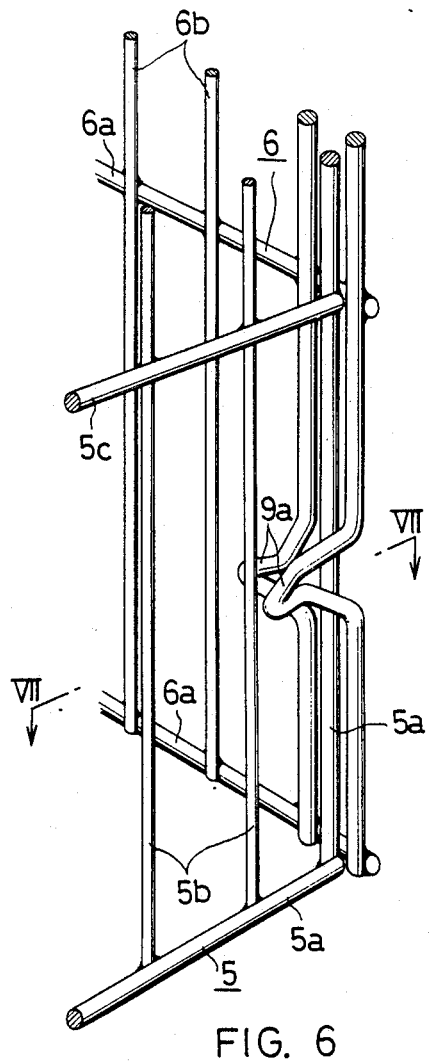
FIG. 6 is a perspective view on an enlarged scale showing another modified version of the embodiment.
Figure 7:
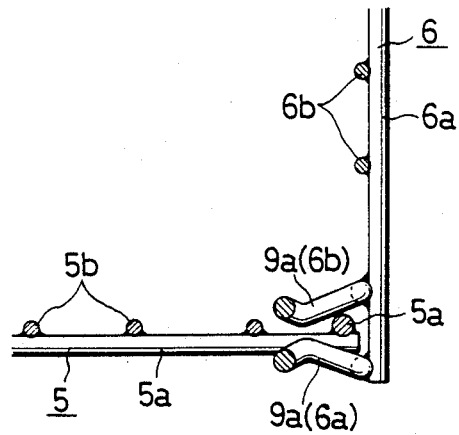
FIG. 7 is a cross-sectional view taken along the VII—VII in FIG. 6.

The cage is assembled in the following manner:

The side gratings 5 and 6 are connected to the ceiling grating 4. The first side gratings 5 are connected to the second side gratings 6 by forcing the frames 5a thereof into between the adjacent two retainers 9a as best shown in FIG. 3. In this way the frames 5a of the first side gratings 5 are retained by the locking bars 9. Because of the fact that the retainers 9a are located at different heights with respect to the base plate 2, the frames 5a is smoothly inserted into between the retainers 9a. FIGS. 6 and 7 show a modified version of the retainers 9a, characterized in that the adjacent retainers 9a are located at the same height with respect to the base plate 2, and that the top portions thereof are bent away from each other so as to produce a gap for allowing the frame 5a to pass through.

The base plate 2 is shaped like a tray as shown in FIG. 1, of a size corresponding to that of the cover grating 1 and having ornamental wheels 10 fixed to the base plate 2. The base plate 2 is provided with a ring-shaped shoulder 2b around the inside periphery so as to allow the grating cover 1 to rest thereon. The reference numeral 2c denotes tabs whereby the cover grating 1 is secured to the base plate 2. The hooks 6d of the second frames 6 are engaged with the holes 2d so as to join the cover grating 4 to the base plate 2.

Ornamental plates 3, made in one piece of plastic, are fixed to the front and back of the first side gratings 5. The ornamental plate 3 is shaped like a gate, having a top panel 3a and side panels 3b having an L-shaped cross-section. The L-shaped cross-sectional side panels 3b hide the unsightly corners of the cover grating 1. Each ornamental plate 3 is provided with pawls 3d whereby the ornamental plates 3 are detachable attached to the first side gratings 5 as shown in FIG. 1.

What is claimed is:

1. A cage for keeping pet animals, the cage comprising:
   a ceiling grating;
   a first side grating
   a second side grating rotatively connected to the first side grating, said first and second side grating each including an outer frame bar and a plurality of crosswise bars;
   a base plate secured to the first and second side grating; and,
   one of the first and the second side grating comprising means for retaining the other side grating so as to secure the rotative connection therebetween, said means including a pair of locking bars arranged on each lateral side of said side grating and which consist of the outer frame bar and an adjacent crosswise bar, each locking bar having a plurality of retainers disposed adjacent to retainers on the respective adjacent locking bar, each retainer being arranged at a different height than its adjacent retainer and consisting of an outwardly directed triangularly shaped deformation of the respective bar, adjacent retainers forming a structure for engaging the outer frame bar of the adjacent side grating;

2. A cage as set forth in claim 1, wherein the the adjacent retaining means are located at equal heights with respect to the base plate, and wherein each of the adjacent retaining means comprises a portion of a bar of the grating which is bent in the shape of a triangle whose top portions are bent away from each other so as to produce a gap therebetween for allowing a bar of the adjacent side gratings to pass through.

3. A cage for keeping pet animals, the cage comprising
   a ceiling grating;
   a pair of first side gratings;
   a pair of second side gratings rotatively connected to the first side gratings, said first and second side gratings each including an outer frame bar and a plurality of crosswise bars;
   a base plate secured to the first and second side gratings; and,
   one of the first and the second side gratings comprising means for retaining the other side gratings so as to secure the rotative connection therebetween, said means including a pair of locking bars arranged on each lateral side of said side grating and which consist of the outer frame bar and an adjacent crosswise bar, each locking bar having a plurality of retainers disposed adjacent to retainers on the respective adjacent locking bar, each retainer being arranged at a different height than its adjacent retainer and consisting of an outwardly directed triangularly shaped deformation of the respective bar, adjacent retainers forming a structure for engaging the outer frame bar of the adjacent side grating.

* * * * *

UNITED STATES PATENT AND TRADEMARK OFFICE
CERTIFICATE OF CORRECTION

PATENT NO. : 4,909,188
DATED : March 20, 1990
INVENTOR(S) : Kazutoshi TOMINAGA

It is certified that error appears in the above-identified patent and that said Letters Patent is hereby corrected as shown below:

Cover page, column 1, item [73], line 2, delete "Kogyyosho" and substitute therefor —Kogyosho—.

Signed and Sealed this

Thirteenth Day of August, 1991

*Attest:*

HARRY F. MANBECK, JR.

*Attesting Officer*  Commissioner of Patents and Trademarks